US011142831B2

(12) United States Patent
Jackson et al.

(10) Patent No.: US 11,142,831 B2
(45) Date of Patent: Oct. 12, 2021

(54) CORROSION CONTROL FOR SUPERCRITICAL CARBON DIOXIDE FLUIDS

(71) Applicants: Tracey Jackson, Sugar Land, TX (US); Sunder Ramachandran, Sugar Land, TX (US); Zhengwei Liu, Sugar Land, TX (US); Jonathan Stewart-Ayala, Houston, TX (US)

(72) Inventors: Tracey Jackson, Sugar Land, TX (US); Sunder Ramachandran, Sugar Land, TX (US); Zhengwei Liu, Sugar Land, TX (US); Jonathan Stewart-Ayala, Houston, TX (US)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 0 days.

(21) Appl. No.: 16/810,953

(22) Filed: Mar. 6, 2020

(65) Prior Publication Data

US 2020/0283913 A1 Sep. 10, 2020

Related U.S. Application Data

(60) Provisional application No. 62/815,641, filed on Mar. 8, 2019.

(51) Int. Cl.
*C23F 11/16* (2006.01)
*C23F 11/14* (2006.01)

(52) U.S. Cl.
CPC .......... *C23F 11/161* (2013.01); *C23F 11/141* (2013.01); *C23F 11/149* (2013.01)

(58) Field of Classification Search
CPC ..... C23F 11/161; C23F 11/141; C23F 11/149; C23F 11/173; C23F 11/162; C23F 11/10
See application file for complete search history.

(56) References Cited

U.S. PATENT DOCUMENTS

| 6,645,399 | B2 | 11/2003 | Ahn et al. | |
|---|---|---|---|---|
| 7,622,035 | B2 * | 11/2009 | Zaki | C10G 21/08 208/309 |
| 9,404,189 | B2 | 8/2016 | Sun et al. | |

(Continued)

FOREIGN PATENT DOCUMENTS

WO 2018093244 A1 5/2018

OTHER PUBLICATIONS

International Search Report for International Application No. PCT/US2020/021412, International Filing Date Mar. 6, 2020, dated Jul. 3, 2020, 3 pages.

(Continued)

*Primary Examiner* — Pamela H Weiss
(74) *Attorney, Agent, or Firm* — Cantor Colburn LLP

(57) ABSTRACT

A method of preventing or mitigating corrosion on a metallic surface exposed to a supercritical fluid is disclosed. The method includes adding a corrosion inhibitor composition to a supercritical fluid comprising a supercritical carbon dioxide; and contacting the supercritical fluid with a metallic surface, wherein the corrosion inhibitor composition comprises a corrosion inhibitor that has a solubility of greater than 5,000 ppm in the supercritical fluid at 48.9° C. and 2,200 psi.

23 Claims, 3 Drawing Sheets

(56) References Cited

U.S. PATENT DOCUMENTS

| | | | |
|---|---|---|---|
| 2006/0180174 A1* | 8/2006 | Kevwitch | G03F 7/427 134/1.3 |
| 2009/0181867 A1 | 7/2009 | Yang et al. | |
| 2010/0301275 A1* | 12/2010 | Babic-Samardzija | C23F 11/10 252/391 |
| 2014/0262280 A1* | 9/2014 | Hill | C09K 8/78 166/304 |
| 2015/0011453 A1* | 1/2015 | Bennett | C11D 11/0041 510/402 |
| 2015/0267113 A1 | 9/2015 | Ramachandran et al. | |

OTHER PUBLICATIONS

Written Opinion for International Application No. PCT/US2020/021412, International Filing Date Mar. 6, 2020, dated Jul. 3, 2020, 5 pages.

* cited by examiner

CORROSION CONTROL FOR SUPERCRITICAL CARBON DIOXIDE FLUIDS

CROSS REFERENCE TO RELATED APPLICATIONS

This application claims the benefit of U.S. Provisional Application No. 62/815,641, filed Mar. 8, 2019, which is incorporated by reference in its' entirety herein.

BACKGROUND

Carbon sequestration is a process of capturing and storing carbon dioxide. Various methods can be used to capture carbon dioxide. For example, carbon dioxide may be captured from flue gas generated from the combustion of fossil fuels at a power plant. Carbon dioxide can also be separated from natural gas obtained from reservoirs. To facilitate its transportation and storage, once captured, carbon dioxide can be compressed to form a supercritical fluid. The supercritical carbon dioxide fluid can then be transported via pipelines to storage sites, where it can be injected to depleted oil and gas reservoirs, salt domes or other geological formations.

In addition to carbon dioxide, the compressed supercritical carbon dioxide fluids can also contain impurities such as water. A small amount of water is soluble in supercritical carbon dioxide fluids. Typically dehydration units are used to remove water from the supercritical fluids prior to disposal. However, under upset conditions such as startup and shutdown free water may drop out if a dehydration unit does not perform to its full capability, and cause rapid corrosion on the metal surfaces in the systems that are used to transport or inject supercritical carbon dioxide fluids. Accordingly corrosion inhibitors are needed to mitigate the potential corrosion risk.

SUMMARY

Disclosed is a method of preventing or mitigating corrosion on a metallic surface exposed to a supercritical fluid. The method includes adding a corrosion inhibitor composition to a supercritical fluid comprising a supercritical carbon dioxide; and contacting the supercritical fluid with a metallic surface, wherein the corrosion inhibitor composition comprises a corrosion inhibitor that has a solubility of greater than 5,000 ppm in the supercritical fluid at 48.9° C. and 2,200 psi.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
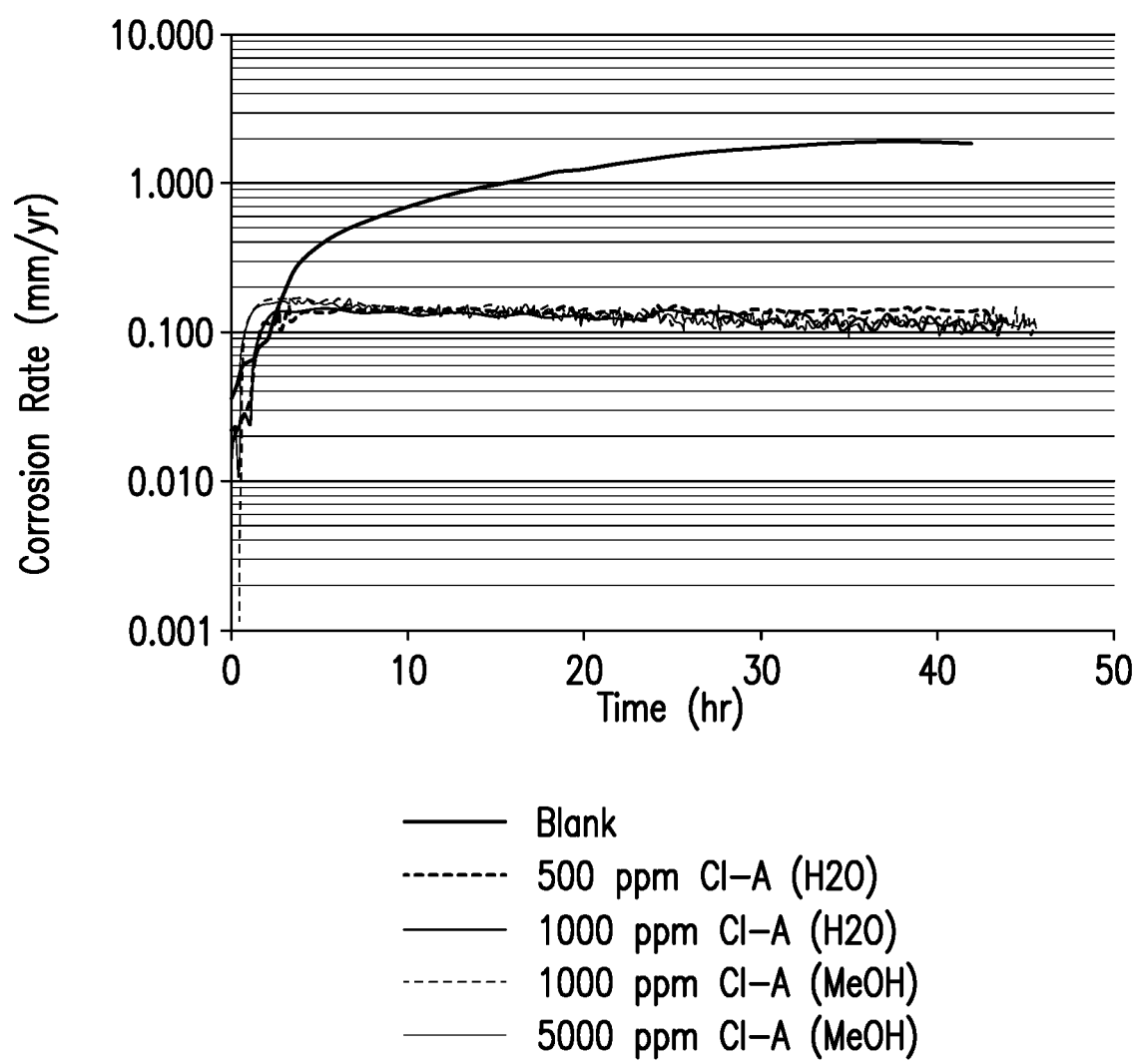
FIG. 1 is a graph of corrosion rate (millimeter/year) as a function of time for a metal coupon (UNS K03014 a.k.a API 5LX65 or just X65) exposed to a supercritical carbon dioxide/water system in the absence or presence of different dosages of 2-mercaptoethanol diluted in methanol or water.

The inventors hereof have identified corrosion inhibitors that can be evenly distributed throughout the system to transport and inject supercritical carbon dioxide fluids to protect all metallic surfaces that are exposed to supercritical carbon dioxide fluids from free water drop out. Advantageously, the corrosion inhibitors disclosed herein are not only soluble in supercritical carbon dioxide, but they can also migrate from supercritical carbon dioxide to water in an effective amount to inhibit corrosion down to a satisfactory corrosion rate. Moreover, the corrosion inhibitors as disclosed herein do not lead to secondary problems such as emulsion, foaming, haze, flocculation, precipitation, separation, changes to reservoir injectivity, or materials degradation, when mixed with supercritical carbon dioxide. The results are surprising because not all known corrosion inhibitors are effective to protect metallic surfaces that are in contact with supercritical carbon dioxide fluids. Some conventional corrosion inhibitors show infinitesimal or no solubility in supercritical carbon dioxide. Other corrosion inhibitors, such as volatile amines, although soluble in supercritical carbon dioxide, can cause salting with gaseous $CO_2$. Thus these inhibitors may separate out of the supercritical fluids during upset conditions, and cannot be carried by the supercritical carbon dioxide to wherever corrosion may occur.

Many supercritical $CO_2$ operations take great care to remove contaminates such as hydrogen sulfide, mercaptans, sulfur dioxide, and other small molecules similar to 2-mercaptoethanol. Based on this fact it is novel and not obvious that the inclusion of molecules such as 2-mercaptoethanol and thioglycolic would be added to prevent corrosion.

Through this body of work it was observed that the corrosion inhibition treatment of supercritical $CO_2$ is similar to treating a dry gas system and not at all like treating the production side of a $CO_2$ flood system. A $CO_2$ flood is where $CO_2$ is injected into injection wells and water, oil, and $CO_2$ are collected at production wells after the fluids have migrated through the oil and gas reservoir. In a $CO_2$ flood system there is a significant amount of water (10-90% of total fluids). In a system with high water content, traditional corrosion inhibitors are very effective because they are dispersed in the water which is present at high quantities and therefore helps distribute the corrosion inhibitors to the metallic surfaces used for transport of the fluids. A traditional dry gas on the other hand is very different because the only inhibitors that will be effective are the ones that can be distributed by the gas phase. In traditional dry gas systems volatile amines are commonly used to treat corrosion. As discussed herein, volatile amines will likely not be effective for supercritical $CO_2$. This illustrates the novelty and inventiveness of the method described here, where the specific inhibitors disclosed herein are soluble in gas and supercritical $CO_2$ and also partition well to the water phase if present. It should be noted that the corrosion inhibitors as disclosed herein could also be used to treat the injection side of a $CO_2$ flood system where the $CO_2$ could be supercritical and would act like a dry gas.

The corrosion inhibitors that are particularly suitable for preventing or mitigating corrosion on a metallic surface that is exposed to a supercritical carbon dioxide fluid can have a solubility of greater than 5,000 ppm at 48.9° C. and 2,200 psi, based on the total volume of the fluid. The corrosion inhibitors can also have a solubility of greater than or equal to 10,000 ppm and less than 100,000 ppm at 48.9° C. and 2,200 psi, based on the total volume of the supercritical carbon dioxide fluid.

Examples of the corrosion inhibitors include 2-mercaptoethanol, thioglycolic acid, or a combination comprising at least one of the foregoing. The corrosion inhibitors can be diluted with a solvent, and added to supercritical carbon dioxide fluids as a corrosion inhibitor composition. The solvent also has adequate solubility in supercritical carbon dioxide fluids at the dosages applied to the sequestration system. Suitable solvents include water, alcohols such as methanol, or a combination thereof. In addition to solvents, the corrosion inhibitor composition may also contain optional components such as dispersants, stabilizers, and the like, provided that these optional components have good solubility in supercritical carbon dioxide and do not adversely affect the desired performance of the corrosion inhibitors.

The amount of the corrosion inhibitors can be 5 to 95 vol %, 20 to 80 vol %, or 40 to 60 vol %, based on the total volume of the corrosion inhibitor composition. The amount of the corrosion inhibitor composition added to the supercritical carbon dioxide fluids can vary depending on the specific supercritical fluid transported or injected and the specific metallic surface to be protected. In general, the corrosion inhibitor can be added to supercritical carbon dioxide fluids in an amount of 100 to 5,000 ppm, 200 to 3,000 ppm, or 500 to 2,000 ppm, based on the total volume of the supercritical carbon dioxide fluids.

As used throughout this disclosure, "supercritical" refers to a substance at a pressure and a temperature greater than those of the substance's critical point, and the substance may exhibit the diffusion of a gas while dissolving materials like a liquid.

The supercritical fluids of the disclosure can include greater than 90 vol %, greater than 95 vol %, or greater than 98 vol % of a supercritical carbon dioxide, based on the total volume of the supercritical fluids. The supercritical fluids can further contain impurities such as the components of natural gas (methane, ethane, propane, etc.), water, nitrogen, sulfur dioxide, oxygen, dimethyl ether, or a combination comprising at least one of the foregoing.

The corrosion inhibitor compositions can be introduced into a system that contains supercritical carbon dioxide fluids using any method known to be useful to those of ordinary skill in the art. The corrosion inhibitors can be introduced continuously or at intervals. The corrosion inhibitors may be added to a supercritical carbon dioxide fluid as it enters a transportation system, or added at different locations of a transportation system, or when the supercritical carbon dioxide fluid is injected downhole. The corrosion inhibitors would normally be added via a stainless steel injection quill but could also be added via direct injection as long as the injection point was not carbon steel.

As used herein, a transportation system means any system for moving supercritical carbon dioxide fluids from the point of capture to a location for either storage (sequestration) or end use. Examples of such a transportation system may include a pipeline, injection well, and in some embodiments associated oil and gas production equipment.

The method of the disclosure may be practiced with carbon dioxide sequestration processes. The supercritical carbon dioxide may be used in enhanced recovery of oil and gas. The corrosion inhibitors can provide excellent protection to the metallic surfaces that are exposed to supercritical carbon dioxide fluids. The protected metallic surfaces include iron, nickel, copper, aluminum, a carbide thereof, an alloy thereof, or a combination comprising at least one of the foregoing. In an embodiment, the protected metallic surface comprises carbon steel. The metallic surface that is exposed to supercritical fluids can have a corrosion rate of less than 0.15 millimeter/year.

Examples

The materials used in the Examples are described in Table 1. Various corrosion inhibitors were evaluated for solubility, corrosion performance, and foaming tendency in supercritical carbon dioxide fluids. The corrosion inhibitors were also studied for material compatibility, stability, and potential impact on formation.

TABLE 1

| Material | Chemical Description |
|---|---|
| CI-1 | 2-mercaptoethanol |
| CI-2 | 1:1, tall oil fatty acid (TOFA):diethylenetriamine (DETA) imidazoline |
| CI-3 | 2:1, TOFA:DETA imidazoline |
| CI-4 | Volatile amine corrosion inhibitor |
| CI-A$_{H2O}$ | 50 vol % of CI-1 in water |
| CI-A$_{MeOH}$ | 50 vol % of CI-1 in methanol |
| CI-B | 50 vol % of alkyldimethylbenzylamine chloride quaternary amine |
| CI-C | Mixture containing sulfur derivative, imidazoline, and quaternary amine |
| PEEK | Polyetheretherketones |
| PE HD | Polyethylene, high density |
| PE HD | Polypropylene, high density |
| PVC | Polyvinyl chloride |
| Teflon | Polytetrafluoroethene |
| Buna N | Acrylonitrile butadiene rubber |
| CSM | Chlorosulfonated polyethylene |
| EPDM | Ethylene propylene diene methylene rubber |
| VITON | Chlorotrifluoroethylenevinylidene fluoride (FKM) |

Solubility Study

A glass vial having the sample to be tested was placed inside a sapphire hydrate rocking cell from PSL Systemtechnik GmbH, but for all of the experiments except the foaming and emulsion tests the cells were stationary. The sapphire cell was heated to 48.9° C. After $CO_2$ was charged, the pressure of the cell was increased to 2,200 psi. When the pressure was released, if no sample was left at the bottom of the glass vial then the sample was deemed soluble since it was distributed throughout the cell by the supercritical $CO_2$. Pressure release was checked to ensure that the sample was not distributed by the act of rapid depressurization. The results are summarized in Table 2.

TABLE 2

| Material | Volume (Concentration) | Visual Solubility |
|---|---|---|
| Methanol | 100 μL (10,000 ppm) | Soluble |
|  | 200 μL (20,000 ppm) | Soluble |
|  | 1000 μL (100,000 ppm) | Not 100% soluble |
| CI-1 | 10 μL (1,000 ppm) | Soluble |
|  | 100 μL (10,000 ppm) | Soluble |
|  | 1000 μL (100,000 ppm) | Not 100% soluble |
| CI-2 | 5 μL (500 ppm) | Not 100% soluble |
|  | 10 μL (1,000 ppm) | Not 100% soluble |
|  | 100 μL (10,000 ppm) | Not 100% soluble |
| CI-3 | 5 μL (500 ppm) | Not 100% soluble |
|  | 100 μL (10,000 ppm) | Not 100% soluble |

From the table, it can be seen that CI-1 showed good solubility of >10,000 ppm in supercritical carbon dioxide. However, Cl-2 and Cl-3 showed significant insolubility even at a concentration as low as 500 ppm.

In addition to solubility, inhibitor partitioning into water was also studied. Good inhibitor partitioning into water would be needed to achieve a satisfactory final corrosion rate. The corrosion inhibitor to be tested (1 mL) was placed outside of a glass tube containing a known amount of water. The 1 mL represents 100,000 ppm of CI-1 which was the first level where CI-1 was insoluble. This ensured that the $CO_2$ would be saturated with CI-1 for this experiment. Both the corrosion inhibitor and the glass tube with water were in a sapphire cell, which was charged with supercritical $CO_2$. A water sample was collected from the glass tube at the end of the test. If the corrosion inhibitor was found in the water sample, it would suggest that the tested corrosion inhibitor was dissolved in supercritical $CO_2$, carried by the supercritical $CO_2$ inside the glass tube, and then partitioned to the water in the glass tube. For comparison, both supercritical $CO_2$ at 2,200 psi and gaseous $CO_2$ at 500 psi were charged to separate cells to study partitioning in water in both stages of $CO_2$.

The results for CI-1 are shown in Table 3. In Table 3, the corrosion inhibitor concentration in water was measured using the inductively coupled plasma (ICP) method. The results indicate that CI-1 can dissolve in supercritical $CO_2$ and then migrate to water, where corrosion is likely to occur, thus providing protection to metal surfaces that are in contact with water.

TABLE 3

| Condition | Concentration of CI-1 in water (ppm) |
| --- | --- |
| Gas $CO_2$ (500 psi) | 127 |
| Supercritical $CO_2$ (2500 psi)-1 | 3030 |
| Supercritical $CO_2$ (2500 psi)-2 | 3018 |

CI-2, CI-3, and CI-4 were also tested. For CI-2 and CI-3, analytical residual methods were not able to yield any meaningful results, which is likely due to the fact that the inhibitors were not dissolved in the $CO_2$ and therefore could not partition to the water. CI-4 was soluble in supercritical $CO_2$ at 2200 psi but at low pressure conditions (500 psi $CO_2$), white solids were formed. The results indicate that CI-4 is likely to form an amine carbonate salt at low pressures. In summary, among the corrosion inhibitors tested, CI-1 was found to have the best solubility in supercritical $CO_2$ and good partitioning in water (about 3,000 ppm).

Corrosion Study

A UNS N10276 1 L autoclave was used. Corrosion resistance was measured using linear polarization resistance (LPR). In the test, corrosion inhibitor in a glass tube was attached to the thermowell of the autoclave. After the corrosion inhibitor and all the electrodes were placed in the autoclave, the autoclave was closed. Low pressure $CO_2$ gas was purged through the cell to remove air. Then deionized water (approximately 600 mL) was introduced at room temperature. LPR recording was started when water was introduced. The heater was activated to heat the autoclave to 60° C. Once the temperature reached the target temperature, $CO_2$ gas (approximately 400 mL) was charged to the autoclave via a booster pump. Once the pressure in the autoclave reached 2,200 psi, the booster pump was turned off.

CI-1 was formulated as a dilution in methanol or water. The results are shown in FIG. 1. A dosage of 1,000 ppm of Cl-$A_{H2O}$ provided a corrosion rate of 0.116 millimeter per year (mm/yr) or 4.6 mils per year (mpy). As seen from the figure, no difference in inhibition performance was observed between methanol and water as the solvent base.

Figure 2:
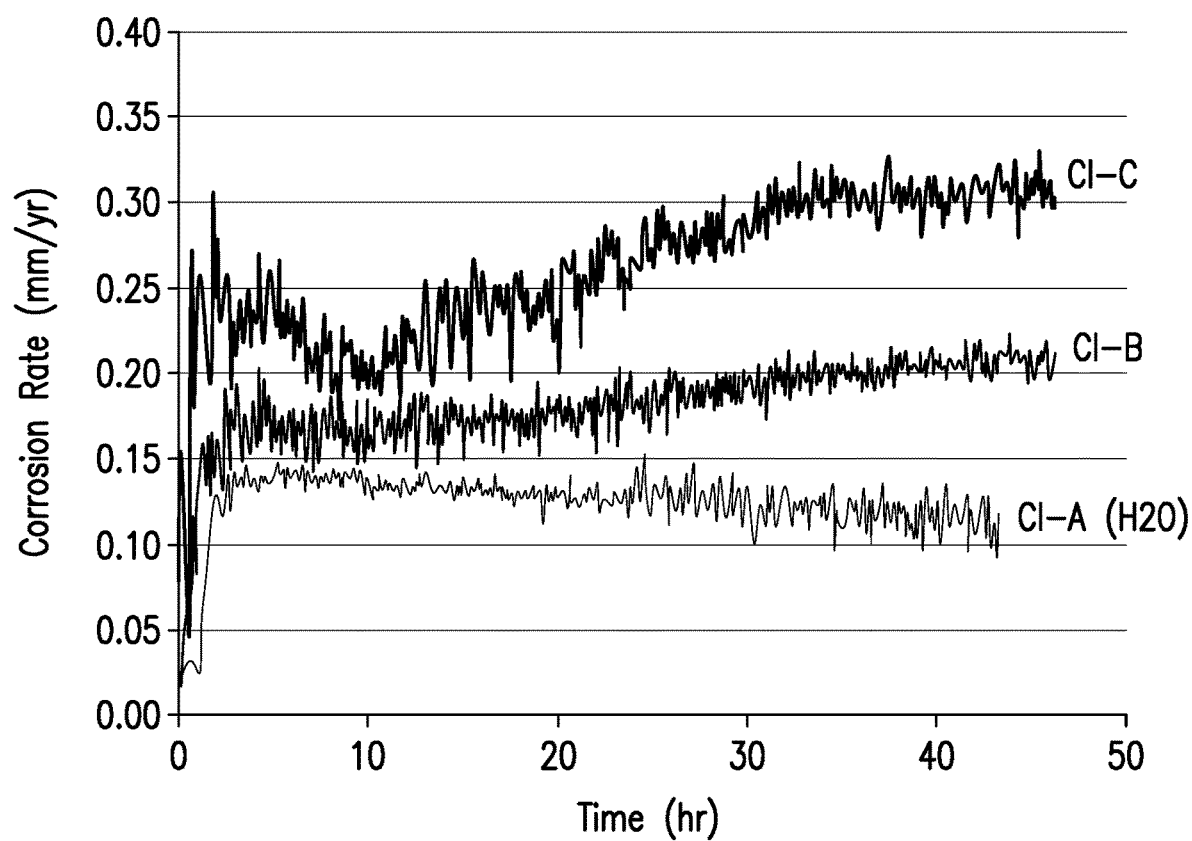
FIG. 2 is a graph of corrosion rate (millimeter/year) as a function of time for a metal coupon (X65) exposed to a supercritical carbon dioxide/water system in the presence of different corrosion inhibitors.

CI-$A_{H2O}$ was then compared to Cl-B and Cl-C. The results are shown in FIG. 2. As shown in the figure, Cl-B and Cl-C were not as effective as CI-$A_{H2O}$.

Two ways of introducing corrosion inhibitors were studied. One way was to apply corrosion inhibitor in the tube, separated from the water (introduced via $CO_2$). The other way was to directly inject the corrosion inhibitor into water (introduced via water). In the test, the temperature was set at 60° C., and the pressure was set at 2,200 psi. Deionized (DI) water (600 mL) with 3% NaCl was used along with approximately 400 mL of supercritical $CO_2$. The corrosion inhibitor concentration was 1000 ppm Cl-A for both tests.

Figure 3:
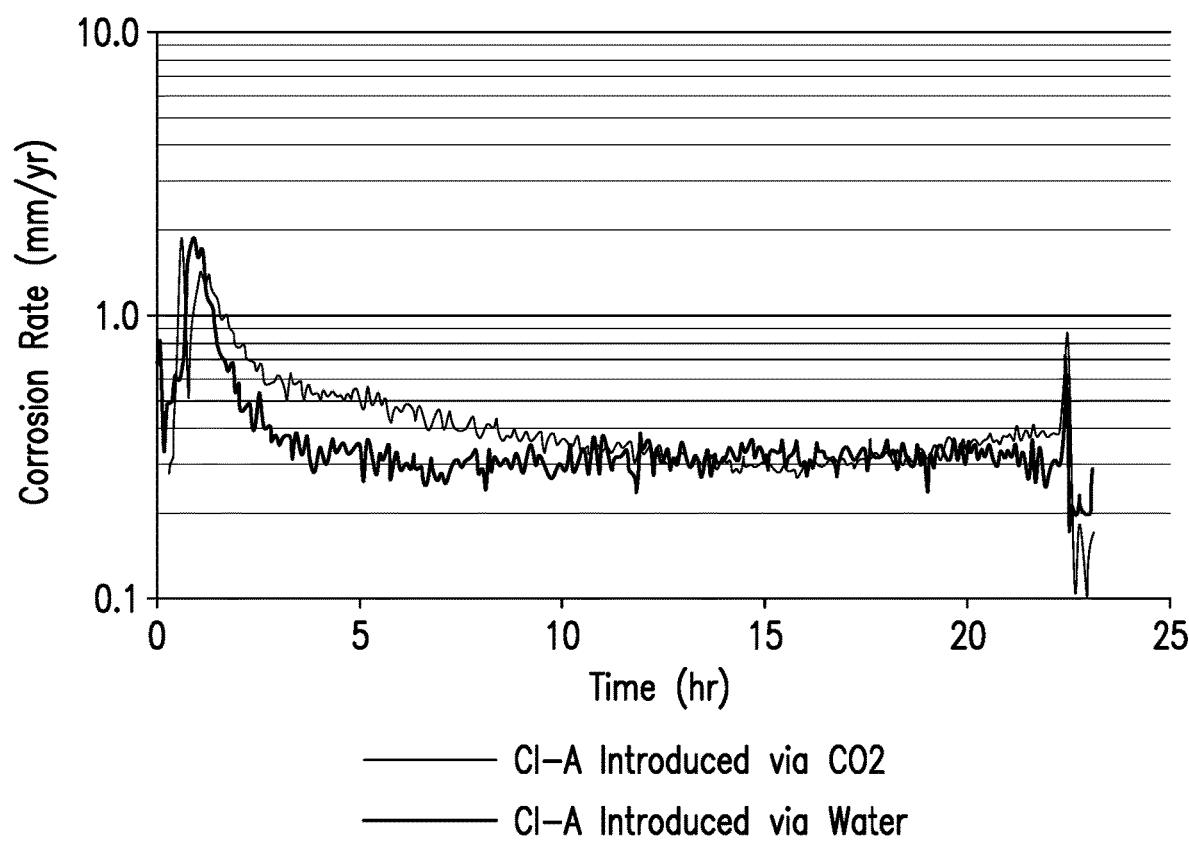
FIG. 3 is a graph of corrosion rate (millimeter/year) as a function of time for a metal coupon (X65) exposed to a supercritical carbon dioxide/water system with the same corrosion inhibitor introduced to the system via different methods.

The corrosion results are shown in FIG. 3. From the figure, it was found that the same final corrosion rate was achieved in both ways of introducing corrosion inhibitor to the system. This indicates that corrosion inhibitor distribution between water and supercritical $CO_2$ reaches the same equilibrium regardless how the corrosion inhibitor was introduced.

High Shear Corrosion Study

In the high speed autoclave test (HSAT), 1500 mL of deionized water was added to a UNS S31600 autoclave. The autoclave was then charged with $CO_2$ to 900-1,000 psi at 24° C. The test temperature was set at 60° C., and the HSAT heating was started. Through the heating process, the HSAT pressure rose to 2,000-2,600 psi, and later settled at 1,600-1,900 psi. The corrosion rate was calculated based on the weight change during a 24 hour test period. In this study, high and low shear were studied with and without corrosion inhibitors. Higher rotation rate of 600 rpm (172 Pa leading edge and 54 Pa average shear stress) was used to represent a high shear condition. Lower rotation rates were also studied for comparison with results from small autoclave tests with much lower shear. The results are summarized in Table 4.

TABLE 4

| Rotation Rate (rpm) | Dosage (ppm) | Corrosion Rate (mpy) | Corrosion Rate (mm/yr) | Efficiency (Protection %) | Shear Stress (Pa) |
| --- | --- | --- | --- | --- | --- |
| 0 | 0 | 148 | 3.8 | 0 | 0 |
| 100 | 0 | 891 | 22.6 | 0 | 12.4 |
| 500 | 0 | 784 | 19.9 | 0 | 131.41 |
| 500 | 1000 | 120 | 3.0 | 84.7 | 131.41 |
| 500 | 2000 | 43 | 1.1 | 94.5 | 131.41 |
| 600 | 0 | 1047 | 26.6 | 0 | 172.54 |
| 600 | 2000 | 327 | 8.3 | 68.8 | 172.54 |

The data shows that without corrosion inhibitors, shear is a critical factor for corrosion. The corrosion rate seen in small autoclaves with minimal shear (1.78 mm/yr or 70 mpy) is in comparable to the corrosion rate seen in HSAT without rotation (3.8 mm/yr or 148 mpy). Higher shear increased the corrosion rate significantly from around 150 mpy to approximately 1,000 mpy, nearly a 7 fold increase. However, at 500 rpm with 2,000 ppm corrosion inhibitor CI-$A_{H2O}$ the corrosion rate was decreased to a 1.1 mm/yr (43 mpy) or a percent protection of 94.5%. At the lower concentration of 1000 ppm CI-$A_{H2O}$ the efficiency dropped to 84.7%. The CI efficiency dropped further at 600 rpm. With the dosage of 2,000 ppm CI-A the rate dropped to 8.3 mm/yr (327 mpy) for an efficiency of 68.8%.

Foaming Tendency Study

The foaming and emulsion tendency of CI-A$_{H2O}$ was also evaluated in a sapphire cell at 500 ppm. No foaming or emulsion was observed. Within seconds, the water phase settled after rocking the cell, indicating that CI-A$_{H2O}$ has a low tendency of foaming or emulsifying the supercritical carbon dioxide/water system.

Burette Swelling Test

Swelling performance of representative rock samples in water with corrosion inhibitors was used as a preliminary indication of whether the corrosion inhibitors may cause reservoir injectivity issues or not. A modified ASTM method D5890-11 was used for the study. The apparatus was a 50 mL burette tube. For all tests except for the deaerated test, gray slate (Ward Scientific, Part #470026-282, 20 g) was powdered, then mixed with the test samples to form a slurry. The slurry was poured into a burette and inverted to mix contents and left to settle. For the deaerated test, the burette was loaded with 20 g of gray slate powder, then purged with nitrogen. Deionized water was sparged with nitrogen then pumped into the burette. The burette was closed off and inverted to mix contents and left to settle.

The swelling test results are summarized in Table 5. As shown in Table 5, CI-1 and CI-A$_{H2O}$ showed no increased damage over that of DI water and deaerated DI water. Burette swelling tests with CI-1 and CI-A$_{H2O}$ in contact with gray slate indicate that CI-1 and CI-A$_{H2O}$ should not adversely affect the formation.

TABLE 5

| Test liquid | Volume (mL) | Settling Time (days) |
|---|---|---|
| Deionized water | 21.5 | 4 |
| Deaerated deionized water | 21.6 | 3 |
| 3% NaCl solution | 20.4 | 4 |
| CI-1 | 17.7 | 4 |
| CI-A$_{H2O}$ | 19.8 | 4 |
| Methanol | 16 | 4 |
| Monoethylene glycol | 16.6 | 4 |

Material Compatibility Results

CI-A$_{H2O}$ was tested with a number of different materials at 60° C. for 14 days. The compatibility results are shown in Tables 6 and 8.

TABLE 6

| | | Corrosion Rate (14-day mpy) | | | | | |
|---|---|---|---|---|---|---|---|
| Material | UNS | Sample 1 | Sample 2 | Sample 3 | Sample 4 | Ave | Rating |
| Admiralty Brass | C44300 | 0.46 | 0.73 | 0.32 | 0.41 | 0.48 | C1 |
| Aluminum | A92024 | 0.28 | 0.07 | 0.00 | 0.07 | 0.11 | C1 |
| Copper | C11000 | 0.90 | 1.35 | 1.08 | 0.99 | 1.08 | C2 |
| Mild Steel | G10180 | 14.87 | 6.12 | 5.38 | 4.95 | 7.83 | C3 |
| SS 304 | S30403 | 0.02 | 0.03 | 0.03 | 0.04 | 0.03 | C0 |
| SS 316 | S31603 | 0.03 | 0.00 | 0.01 | 0.04 | 0.02 | C0 |
| WC w/titanium | n/a | — | 0.00 | 0.00 | 0.01 | 0.00 | C0 |
| WC C2 6% cobalt | n/a | — | 0.04 | 0.04 | 0.03 | 0.04 | C0 |
| WC C2 10% cobalt | n/a | — | 0.03 | 0.03 | 0.02 | 0.03 | C0 |
| WC w/6% nickel | n/a | — | 0.05 | 0.03 | 0.04 | 0.04 | C0 |
| EL GILOY | R0003 | | 0.00 | 0.00 | 0.00 | 0.00 | C0 |
| SIELLI1E 6B | R3006 | | 0.00 | 0.02 | 0.00 | 0.01 | C0 |

*n/a = not available

TABLE 7

Legend for Table 6

| | Corrosion Rate (mpy) | | |
|---|---|---|---|
| Rating | Lower | Upper | Corrosion Description |
| C0 | 0 | 0.1 | No corrosion |
| C1 | 0.1 | 1 | Very Light Corrosion |
| C2 | 1 | 5 | Light Corrosion |
| C3 | 5 | 10 | Moderate Corrosion |
| C4 | 10 | 20 | Heavy Corrosion |
| C5 | 20 | >20 | Very Heavy Corrosion |

TABLE 8

| | Weight Change (%) | | | | | | | | | | |
|---|---|---|---|---|---|---|---|---|---|---|---|
| | Air Dry | | | | | Oven Dry | | | | | |
| Material | Sample 1 | Sample 2 | Sample 3 | Sample 4 | Ave | Sample 1 | Sample 2 | Sample 3 | Sample 4 | Ave | Class |
| PEEK | — | 0.28 | 0.27 | 0.23 | 0.26 | — | −0.11 | −0.10 | −0.13 | −0.11 | E1 |
| PE HD | 0.35 | 0.48 | 0.60 | 0.40 | 0.46 | −0.04 | 0.04 | 0.08 | 0.00 | 0.02 | E1 |
| PP HD | 0.41 | 0.42 | 0.58 | 0.45 | 0.47 | −0.03 | −0.01 | 0.03 | 0.06 | 0.01 | E1 |
| PE, linear | 2.03 | 2.45 | 2.94 | 2.71 | 2.53 | −0.03 | 0.06 | 0.02 | −0.04 | 0.00 | E2 |

TABLE 8-continued

| | Weight Change (%) | | | | | | | | | | |
|---|---|---|---|---|---|---|---|---|---|---|---|
| | Air Dry | | | | | Oven Dry | | | | | |
| Material | Sample 1 | Sample 2 | Sample 3 | Sample 4 | Ave | Sample 1 | Sample 2 | Sample 3 | Sample 4 | Ave | Class |
| PVC | 0.68 | 0.56 | 0.71 | 0.60 | 0.64 | −0.07 | −0.06 | 0.06 | −0.01 | −0.02 | E1 |
| Teflon | 0.02 | 0.03 | 0.06 | 0.00 | 0.03 | −0.04 | 0.00 | 0.01 | 0.00 | −0.01 | E1 |
| Buna N | 14.68 | 16.34 | 16.21 | 16.26 | 15.87 | −0.33 | 2.40 | 2.39 | 3.20 | 1.91 | E3 |
| CSM | 34.89 | 25.01 | 30.01 | 31.43 | 30.34 | 2.54 | 2.00 | 1.96 | 3.00 | 2.38 | E4 |
| EPDM | 6.15 | 6.46 | 6.52 | 6.02 | 6.29 | −0.31 | 0.77 | 0.28 | 0.46 | 0.30 | E2 |
| Neoprene | 62.93 | 56.02 | 59.32 | 57.84 | 59.03 | 1.00 | 6.55 | 7.91 | 7.51 | 5.74 | E5 |
| Viton | 21.79 | 19.00 | 21.55 | 19.86 | 20.55 | 4.71 | 5.29 | 5.41 | 5.23 | 5.16 | E3 |

TABLE 9

Legend for Table 8

| | Δ Weight (%) | | |
|---|---|---|---|
| Rating | Lower | Upper | Classification |
| E1 | 0 | 1 | No Significant Change |
| E2 | 1 | 10 | Satisfactory |
| E3 | 10 | 25 | Doubtful |
| E4 | 25 | 50 | Unsatisfactory |
| E5 | >50 | 50 | Unsatisfactory |

The results show that at 60° C. and for 14 days, minimal or no corrosion was seen with most metals, including copper, aluminum, and stainless steel. With plastics, there was only minimal change to the materials in swelling and deformation. CI-A$_{H2O}$ also has good compatibility with EPDM.

Corrosion Inhibitor Stability at High and Cold Temperatures

Three-day temperature stability tests at high (100° C.) and low (−6 and −31° C.) temperatures were conducted with CI-A$_{H2O}$. The corrosion inhibitor showed no chemical transformations at any temperature. The corrosion inhibitor froze within a few hours at −31° C. but the physical transformation was reversible when the sample was exposed to room temperature.

Further included in this disclosure are the following specific embodiments, which do not necessarily limit the claims.

Embodiment 1

A method of preventing or mitigating corrosion on a metallic surface exposed to a supercritical fluid, the method comprising: adding a corrosion inhibitor composition to a supercritical fluid comprising a supercritical carbon dioxide; and contacting the supercritical fluid with a metallic surface, wherein the corrosion inhibitor composition comprises a corrosion inhibitor that has a solubility of greater than 5,000 ppm in the supercritical fluid at 48.9° C. and 2,200 psi.

Embodiment 2

The method as in any prior embodiment, wherein the corrosion inhibitor has a solubility of greater than or equal to 10,000 ppm and less than 100,000 ppm in the supercritical fluid at 48.9° C. and 2,200 psi.

Embodiment 3

The method as in any prior embodiment, wherein the supercritical carbon dioxide is present in an amount of greater than 90 vol % in the supercritical fluid, based on the total volume of the supercritical fluid.

Embodiment 4

The method as in any prior embodiment, wherein the supercritical fluid further comprises water.

Embodiment 5

The method as in any prior embodiment, wherein the supercritical fluid further comprises a component of natural gas, nitrogen, nitrogen dioxide, sulfur dioxide, oxygen, dimethyl ether, or a combination comprising at least one of the foregoing.

Embodiment 6

The method as in any prior embodiment, wherein the corrosion inhibitor migrates to water condensed on the metallic surface.

Embodiment 7

The method as in any prior embodiment, wherein the corrosion inhibitor comprises 2-mercaptoethanol, thioglycolic acid, or a combination comprising at least one of the foregoing.

Embodiment 8

The method as in any prior embodiment, wherein the corrosion inhibitor composition further comprises a solvent, which is water, methanol, or a combination thereof.

Embodiment 9

The method as in any prior embodiment, wherein the corrosion inhibitor is present in an amount of 10 to 95 vol % in the corrosion inhibitor composition, based on the total volume of the corrosion inhibitor composition.

Embodiment 10

The method as in any prior embodiment, wherein the corrosion inhibitor composition is added to the supercritical fluid in an amount of 500 to 5,000 ppm based on the total volume of the supercritical fluid.

Embodiment 11

The method as in any prior embodiment, wherein the metallic surface comprises iron, nickel, copper, aluminum, a carbide thereof, an alloy thereof, or a combination comprising at least one of the foregoing.

Embodiment 12

The method as in any prior embodiment, wherein the metallic surface comprises carbon steel.

Embodiment 13

The method as in any prior embodiment, wherein the metallic surface has a corrosion rate of less than 0.15 millimeter/year.

Embodiment 14

The method as in any prior embodiment, wherein the supercritical fluid is contacted with the metallic surface during a carbon dioxide capturing and sequestering operation.

Embodiment 15

The method as in any prior embodiment, wherein the corrosion inhibitor composition is added to a pipeline originating from a carbon dioxide capture facility, an injection well tubular, or a combination thereof.

As used throughout the disclosure, UNS refers to Unified Numbering System for Metals and Alloys. UNS numbers are listed in Metals & Alloys in the Unified Numbering System, 10th ed. (Warrendale, Pa.: SAE International and West Conshohocken, Pa.: ASTM International, 2004). API refers to American Petroleum Institute, 1220 L Street, Washington, D.C. 20005.

All ranges disclosed herein are inclusive of the endpoints, and the endpoints are independently combinable with each other. As used herein, "combination" is inclusive of blends, mixtures, alloys, reaction products, and the like. The size of the particles refers to the largest dimension of the particles and can be determined by high resolution electron or atomic force microscope technology. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A method of preventing or mitigating corrosion on a metallic surface exposed to a supercritical fluid, the method comprising:
   adding a corrosion inhibitor composition to a supercritical fluid comprising a supercritical carbon dioxide; and
   contacting the supercritical fluid with a metallic surface,
   wherein the corrosion inhibitor composition comprises a corrosion inhibitor that has a solubility of greater than 5,000 ppm in the supercritical fluid at 48.9° C. and 2,200 psi,
   wherein the supercritical fluid is contacted with the metallic surface during a carbon dioxide capturing and sequestering operation.

2. The method of claim 1, wherein the corrosion inhibitor has a solubility of greater than or equal to 10,000 ppm and less than 100,000 ppm in the supercritical fluid at 48.9° C. and 2,200 psi.

3. The method of claim 1, wherein the supercritical carbon dioxide is present in an amount of greater than 90 vol % in the supercritical fluid, based on the total volume of the supercritical fluid.

4. The method of claim 1, wherein the supercritical fluid further comprises water.

5. The method of claim 1, wherein the supercritical fluid further comprises a component of natural gas, nitrogen, nitrogen dioxide, sulfur dioxide, oxygen, dimethyl ether, or a combination comprising at least one of the foregoing.

6. The method of claim 1, wherein the corrosion inhibitor migrates to water condensed on the metallic surface.

7. The method of claim 1, wherein the corrosion inhibitor comprises 2-mercaptoethanol, thioglycolic acid, or a combination comprising at least one of the foregoing.

8. The method of claim 1, wherein the corrosion inhibitor composition further comprises a solvent, which is water, methanol, or a combination thereof.

9. The method of claim 1, wherein the corrosion inhibitor is present in an amount of 10 to 95 vol % in the corrosion inhibitor composition, based on the total volume of the corrosion inhibitor composition.

10. The method of claim 1, wherein the corrosion inhibitor composition is added to the supercritical fluid in an amount of 500 to 5,000 ppm based on the total volume of the supercritical fluid.

11. The method of claim 1, wherein the metallic surface comprises iron, nickel, copper, aluminum, a carbide thereof, an alloy thereof, or a combination comprising at least one of the foregoing.

12. A method of preventing or mitigating corrosion on a metallic surface exposed to a supercritical fluid, the method comprising:
   adding a corrosion inhibitor composition to a supercritical fluid comprising a supercritical carbon dioxide; and
   contacting the supercritical fluid with a metallic surface,
   wherein the corrosion inhibitor composition comprises a corrosion inhibitor that has a solubility of greater than 5,000 ppm in the supercritical fluid at 48.9° C. and 2,200 psi,
   wherein the metallic surface comprises carbon steel.

13. The method of claim 1, wherein the metallic surface has a corrosion rate of less than 0.15 millimeter/year.

14. The method of claim 12, wherein the supercritical fluid is contacted with the metallic surface during a carbon dioxide capturing and sequestering operation.

15. A method of preventing or mitigating corrosion on a metallic surface exposed to a supercritical fluid, the method comprising:
   adding a corrosion inhibitor composition to a supercritical fluid comprising a supercritical carbon dioxide; and
   contacting the supercritical fluid with a metallic surface,
   wherein the corrosion inhibitor composition comprises a corrosion inhibitor that has a solubility of greater than 5,000 ppm in the supercritical fluid at 48.9° C. and 2,200 psi, and
   wherein the corrosion inhibitor composition is added to a pipeline originating from a carbon dioxide capture facility, an injection well tubular, or a combination thereof.

16. The method of claim 15, wherein the supercritical carbon dioxide is present in an amount of greater than 90 vol % in the supercritical fluid, based on the total volume of the supercritical fluid.

17. The method of claim 15, wherein the supercritical fluid further comprises water.

18. The method of claim 15, wherein the supercritical fluid further comprises a component of natural gas, nitrogen, nitrogen dioxide, sulfur dioxide, oxygen, dimethyl ether, or a combination comprising at least one of the foregoing.

19. The method of claim 15, wherein the corrosion inhibitor migrates to water condensed on the metallic surface.

20. The method of claim 15, wherein the corrosion inhibitor comprises 2-mercaptoethanol, thioglycolic acid, or a combination comprising at least one of the foregoing.

21. The method of claim 15, wherein the corrosion inhibitor composition further comprises a solvent, which is water, methanol, or a combination thereof.

22. The method of claim 15, wherein the corrosion inhibitor is present in an amount of 10 to 95 vol % in the corrosion inhibitor composition, based on the total volume of the corrosion inhibitor composition.

23. The method of claim 15, wherein the corrosion inhibitor composition is added to the supercritical fluid in an amount of 500 to 5,000 ppm based on the total volume of the supercritical fluid.

* * * * *